United States Patent
Lambrecht

[15] 3,650,648
[45] Mar. 21, 1972

[54] SYSTEM FOR MOLDING ELECTRONIC COMPONENTS

[72] Inventor: Richard A. Lambrecht, Greenville, S.C.
[73] Assignee: Union Carbide Corporation, New York, N.Y.
[22] Filed: Feb. 25, 1970
[21] Appl. No.: 13,956

[52] U.S. Cl. .............................................. 425/129, 425/242
[51] Int. Cl. .......................................................... B29c 6/04
[58] Field of Search ........................ 18/5 E, 30 UM, DIG. 62

[56] References Cited

UNITED STATES PATENTS

| | | | |
|---|---|---|---|
| 2,197,465 | 4/1940 | Brunetti | 18/30 UM X |
| 2,794,211 | 6/1957 | Brown et al. | 18/5 E |
| 3,266,099 | 8/1966 | Bucy | 18/DIG. 62 |
| 3,389,461 | 6/1968 | Hardardt | 18/5 E X |

Primary Examiner—H. A. Kilby, Jr.
Attorney—Paul A. Rose, Thomas I. O'Brien, Harrie M. Humphreys and Leo A. Plum, Jr.

[57] ABSTRACT

System for injection molding components including process and an apparatus consisting of at least two mold parts having molding cavities formed therein when the parts are brought together, a sheet-like frame member disposed between the mold parts and having a pattern of cutouts therein defining central openings in registry with mold cavities and pairs of slots in the sheet extending from the openings to form elongated prong-like strips which extend into the cavities and support the electronic components therein, and a passage in one of the mold parts overlying the slots in the sheet whereby fluid molding material can be flowed through said slots and into the cavities to encapsulate the components therein.

19 Claims, 11 Drawing Figures

Patented March 21, 1972

INVENTOR
RICHARD A. LAMBRECHT
BY Leo A. Plum, Jr.
ATTORNEY

Patented March 21, 1972

INVENTOR
RICHARD A. LAMBRECHT
BY
Leo A. Plump
ATTORNEY

Patented March 21, 1972 3,650,648

INVENTOR
RICHARD A. LAMBRECTH
BY
Leo A. Plum, Jr.
ATTORNEY

INVENTOR
RICHARD A. LAMBRECHT
BY Leo A. Plum, Jr.
ATTORNEY

SYSTEM FOR MOLDING ELECTRONIC COMPONENTS

This invention relates to process and apparatus for molding electronic components in insulative materials, and to the molded components so produced.

The large variety of active and passive electronic components marketed today are generally available in different types of packaging systems, providing different degrees of protection to the enclosed components, depending on the conditions of the intended use and on the price which must be met. Solid electrolytic tantalum capacitors, for example, can be supplied in hermetically sealed metal cans which provide excellent environmental and mechanical protection to the component under the most stringent conditions of use. A less expensive but still highly reliable packaging system can consist of an insulating plastic case molded around the component. Such molded capacitors provide a high degree of mechanical protection to the component; and because of the uniformity, compactness, and relatively low cost of the molded capacitors, they are especially used with printed circuitry and in high density packaging applications where space is at a premium and where automatic assembly methods can be used.

The manufacture of molded electronic components is hindered, however, by the complexity of the molding equipment, which has not changed significantly over the years to meet the needs of this particular type of molding operation. In the transfer injection molding operation, for example, formidable presses have upper and lower cavity plates, which must be expensively machined to provide a large number of molding cavities, runners and gates to the individual cavities, as well as grooves for the lead wires of the components to be centered in the cavity. These cavity plates are each secured to upper and lower platens which provide the heat needed to keep the molding compound fluid. In a typical example, pressures of up to sixty tons are needed to close and seal such a press having cavity plates only 16 inches by 6 inches in size and holding as little as 60 components. Such large pressures can cause warpage of the cavity plates and, in view of the fact that the molding material need often be supplied at pressures of only 100 pounds per square inch, it would seem wasteful to require the use of such heavy and expensive equipment to perform a molding operation on components so small and so fragile. However, if it desired to mold a large number of components at one time, and cost considerations often require this, then equipment of the type described above must generally be used.

Another problem involved in the molding of a multiplicity of components in a single pressing operation is the need to properly center all the components in the numerous die cavities. If even one lead wire is left out of the proper groove leading to a cavity, the press cannot close and the molding material will flow over the surfaces of the non-mating cavity plates. Frames which hold the rows of components by supporting the extremities of their lead wires must be used, and even so, great care must be exercised by the press operator to ensure proper placement of the component loaded frame between the cavity plates. And of course, the lead wires or strip terminations on the components must be accurately positioned on the frames, an operation requiring complex fixturing, so that these leads will properly center the component in the cavity. Additionally, there are limitations imposed on the types and shapes of the lead wire terminations which can be used in molded components, since the basic considerations of the molding operation, i.e., proper support and centering of the component in the cavity, avoidance of the need for excessive machining of the die cavities to accommodate complex lead configurations, etc., all take precedence over the component designer's interests in improving the design and performance characteristics of the component and its lead system.

In view of the above, it is clear that an improved system for molding insulative and particularly plastic materials around electronic components would be highly welcomed in the industry.

It is the primary object of this invention therefore to provide improved process and apparatus for molding leaded electronic components.

It is a further object of this invention to provide a molding system which avoids the need for expensive machining of multiple die cavity plates and the heavy pressing equipment associated therewith.

It is another object of this invention to provide a molding system and component leading arrangement adopted for use therewith which allows for automatic jigging of the component onto the leads and for automatic centering of the components in the die cavity.

It is also an object of this invention to provide an improved termination system for electronic components which is specially adapted for and compatible with the molding system set out herein and which additionally allows great versatility in the design and usage of the component.

Other aims and advantages of this invention will be apparent from the following description, the appended claims and the attached drawings.

SUMMARY OF THE INVENTION

In accordance with these objects an invention is provided consisting of an improved system for molding components in insulative material, said system consisting of at least two mold parts which have at least one molding cavity portion formed therein defining at least one molding cavity when said mold parts are brought together, a sheetlike metallic frame member adapted to fit snugly between the mating mold parts, said frame having a pattern of cutouts therein defining a central opening in registry with the mold cavity opening and at least two pairs of spaced-apart slots extending from said central opening to points on said frame short of its edges defining at least two narrow, elongated prong-like strips each joined to the metal frame at one end only with the free ends of said strips extending into the mold cavity and supporting an electronic component in said cavity, a passageway in one of said mold parts communicating with at least one of said cutouts leading to a mold cavity, for example, one of the slots, for introducing fluid molding material along said cutout and into the mold cavity to encapsulate said component, with at least one other of said cutouts extending from said cavity, for example, another selected slot serving as an overflow passage to receive excess molding material from said cavity, and means for pressing said mold parts and interposed frame member together to seal the mating surfaces of said frame member and the mold parts to prevent escape of molding material from said cavity and the slots.

Heat may be applied to the mold parts as needed to maintain the molding material fluid during filling of the mold cavities or to cause it to set, depending on the type of molding compounds employed. When the molding material has set, the mold parts are separated and the frame member carrying the now molded components is removed. The individual components are removed from the frame member, either immediately or at any convenient time, for example, during their actual incorporation into a circuit assembly, by severing the prong-like strips from the frame member. Since these prong-like strips are connected internally to the terminals of the encapsulated component, the portions of the prong-like strips extending from the molded unit can be utilized as the external leads of the device. Accordingly, the pattern of cutouts and slots in the frame member is designed to provide prong-like strips which are or can subsequently be shaped to provide a desired lead configuration. In this way external leads of various types, for example the radial, pointed type for insertion in circuit board openings, or strip-line and beam leads for planar mounting on circuit substrates, or any other type of lead system can be provided on the molded unit.

More specifically, for molding a plurality of components, the molding apparatus will consist of at least two mold parts which have a plurality of molding cavity portions formed therein defining a plurality of spaced-apart molding cavities when said mold parts are brought together, a sheetlike metallic frame member adapted to fit snugly between the mating mold parts, said frame having a pattern of cutouts therein defining a plurality of central openings spaced apart in correspondence with the spacing of the mold cavities and with the frame openings in registry with the cavity openings, and at least two pairs of spaced-apart slots in said frame extending from each central opening to points on said frame short of its edges and defining at least two narrow, elongated prong-like strips each joined to the metal frame at one end only with the free ends of said strips extending into the mold cavity in registration with said respective frame opening, a plurality of electronic components each supported in a mold cavity on the free ends of the at least two prong-like strips extending into each mold cavity, a sprue-like passageway in said mold parts communicating with runner passageways in said mold parts communicating with at lest one slot for each mold cavity for introducing fluid molding material through said slots and into the mold cavities to encapsulate said electronic components, with at least one other of said slots from each mold cavity serving as an overflow passageway to receive excess molding material overflowing from said mold cavities, and means for pressing said mold parts and interposed frame member together to seal the mating surfaces of said frame and mold parts to prevent escape of molding material from said cavities and slots.

Additionally, shallow grooves may be formed in at least one of the mating surfaces of the mold parts, said grooves extending from each mold cavity to the exterior of the molding apparatus to service as gas vents allowing the escape of gas from the cavities as they are filled with molten molding material.

The invention also specifically includes a molding apparatus consisting of a base plate, an upper runner plate, a cavity plate intermediate the runner and base plates and having a plurality of spaced-apart openings therethrough, a sheetlike frame member disposed between the cavity plate and the runner plate, said frame member having a pattern of cutouts therein defining a plurality of central openings in registry with the openings in the cavity plate and at least two pairs of spaced-apart slots in said frame extending from each opening to points in said frame short of its edges defining at least two narrow, elongated prong-like strips each joined to the frame at one of their ends only with their free ends bent out of the plane of said frame member into the opening in the cavity plate, a plurality of electronic components each supported in an opening in the cavity plate on the bent ends of the at least two prong-like strips, whereby when said base plate, cavity plate, frame member and runner plate are brought together a plurality of mold cavities are defined with the base and runner plates forming the floors and roofs of the mold cavities and with the registered openings in the cavity plate and frame member forming the side walls of the mold cavities, said runner plate additionally having a sprue hole extending therethrough and communicating with at least one runner-like depression therein overlying and communicating with at least one selected slot in the frame member extending to each mold cavity so that the fluid molding material can be introduced from said sprue hole into the runner depressions and through the underlying slots into the mold cavities to encapsulate the components therein, with other selected slots extending from each of said mold cavities serving as overflow passages to receive excess molding from the mold cavities, and means for pressing said mold parts together to seal the mating surfaces of the members and present the escape of molding material from said mold cavities, runner depressions and slots.

In the case of molding electronic components of the bipolar type, that is having only two electrical terminals to be contacted, then the frame will usually have only two prong-like strips extending into each mold cavity with the component joined to the free ends of said strips at each terminal. In the case of electronic components having more than two terminals, then the frame member will have a corresponding number of prong-like metal strips to be connected to the appropriate terminals on the component. Since the portions of the prong-like metal strips actually extending into the mold cavity will be themselves encapsulated in the molded unit, and since the portions of said prong-like strips outside the mold cavity are destined to serve as the external leads of the molded component, the placement of the prong-like strips on the frame member relative to the central opening therein is dictated by the desired placement of component in the mold cavity and by the desired arrangement of the leads as they extend from the molded unit. As an example, if it is desired to manufacture a molded bipolar component having an axial lead arrangement, then the prong-like strips will be arranged to extend into the central openings in the frame by having one pair of slots formed at either end of said opening. If it is desired to have coplanar radially arranged leads, then the prong-like strips will be made to both extend from one side of the central opening by having the prong-like strips extending from appropriately spaced-apart point on the side of the central opening.

In an embodiment of the apparatus particularly suited for encapsulating solid electrolytic capacitors of the type having a pellet-like body and an anode lead wire extending from an end of said body at a level offset from the planes defined by the sides of said body, the frame member can have the free end portions of the prong-like strips extending into the central opening bent to provide component bonding pads at different levels in said mold cavity corresponding to the desired levels of support of the body portion of the capacitor and the anode lead wire portion, the difference in the levels of the two pads corresponding to the offset distance between the contacted plane of the body portion and the contacted plane of the anode lead wire portion. Other suitable arrangements of the levels and positions of the free ends of the prong-like strips can be made to provide appropriate bonding pads to receive the terminals of components of any configuration and to properly support said components in the mold cavities in noncontiguous relationship with the walls thereof, as well as to provide suitably arranged and shaped external leads for said components.

It is an important feature of this invention that the mold parts utilized in the apparatus are simple and free of the need for executive machining to form the mold cavities. As will be hereinafter explained, the mold cavities may be formed entirely in the cavity plate and by metal working techniques of less complexity than is normally required in forming conventional die cavities in mating mold parts.

Additionally the mold parts can be of relatively light weight, particularly the cavity plates and frame members. The cavity plate, when one is used, will be of a thickness only as much as that of the molded unit and so this plate will be relatively flexible. The frame member can be formed of light weight sheet metal of sufficient thickness to allow its use in providing the leads for the components and to allow sufficient passageway in the form of the slots for the flow of fluid molding material to the mold cavities. This member should be composed of a more malleable metal, for example brass, than the other mold parts. As a result of the use of a thin flexible cavity plate and an even thinner and malleable frame member, it is possible to close and seal the mold parts with a lesser amount of pressure than is needed in conventional molding apparatus. This is so because the flexible cavity plate and frame member will more easily deform under pressure to provide the necessary seal preventing the escape of molding material.

The invention also includes the process for manufacturing molded electronic components including the steps of:

a. forming a metal sheet to have a series of spaced apart cutout patterns, each pattern including at least two sets of spaced-apart pairs of slots extending from a central opening to points on said sheet short of its edges to define at least two narrow, elongated prong-like strips each joined to the metal sheet at one end only with their free ends extending towards the central opening, said central opening having a width corresponding to the desired width of the molded part, b. connecting the free ends of the metal strips to the terminals of a row of electronic components to make electrical contacts thereto and to support each of said components in one of the central openings, c. situating the metal strip in a closable mold having mold cavities of the same width as the width of the central openings in the sheet and spaced apart in correspondence with the spacing of said central openings, and closing the mold whereby each component is supported in a mold cavity in non-contiguous relationship with the walls thereof, d. introducing fluid molding material into at least one of said cutouts extending to a mold cavity, for example one of the slots, for passage into the mold cavity to fill the mold and encapsulate the component therein with the excess molding material flowing into at least one other of said cutouts extending from each cavity, e. causing the molding material to set, opening the mold and then removing the metal sheet with its supported molded components from the mold, f. severing the prong-like strip from the carrier strip to form individual molded components having striplike terminal connections extending therefrom.

More particularly, in regard to step (a) the free end portions of the prong-like metal strips extending into the central opening are bent out of the plane of the sheet and into the mold cavity to form contact pads for connection to the terminals of the component.

Additionally, in regard to steps (c) and (d), the gases contained in the mold cavities are vented from said cavities during filling thereof with molten molding material.

DESCRIPTION OF THE PREFERRED EMBODIMENTS

Figure 1:
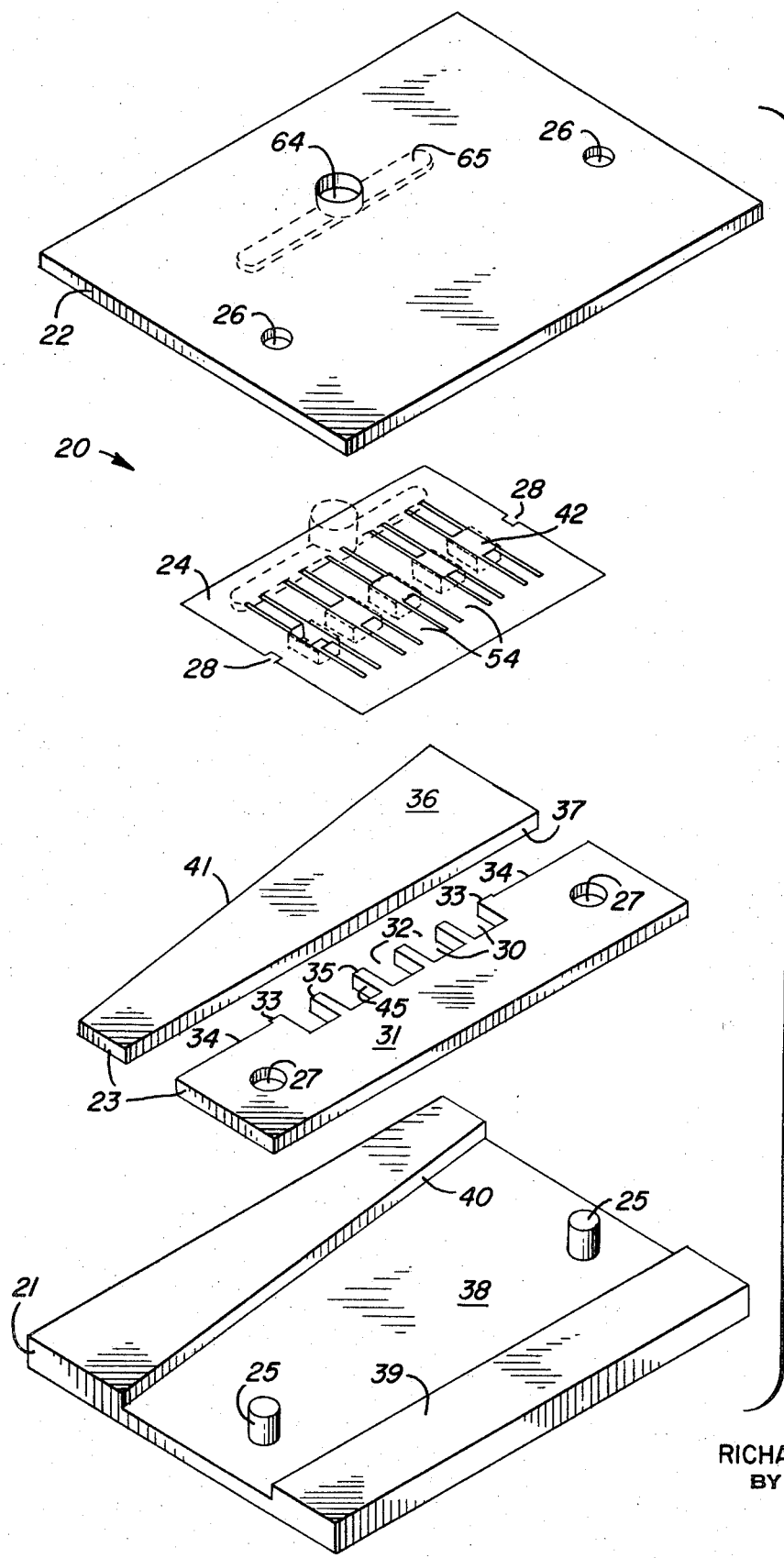
FIG. 1 is an exploded perspective view of a preferred embodiment of the molding apparatus of this invention.

Referring to FIG. 1, a molding apparatus 20 is shown. The apparatus consists of several mating sections including a lower base plate 21, an upper runner plate 22, a cavity plate assembly 23, and a frame member 24 for supporting the components to be encapsulated in the mold cavities.

The lower plate 21 and upper plate 22 are to be connected, respectively, to the lower and upper sections of a suitable press, not shown; whereby the lower and upper plates may be brought together to close over the cavity plate assembly and frame member and to apply an appropriate amount of pressure to seal the mating parts of the mold. The lower and upper sections of the press will be appropriately heated so as to supply heat to the lower and upper plates 21 and 22 as needed to maintain the molding material fluid and/or to cause it to set.

The lower base plate 21 may be provided with alignment pins 25 which mate with corresponding holes 26 in the upper runner plate 22 to ensure proper alignment of the mating sections of the mold. Alignment holes 27 are also formed in the cavity plate 23 and additionally as notches 28 in the frame member 24.

Figure 1A:
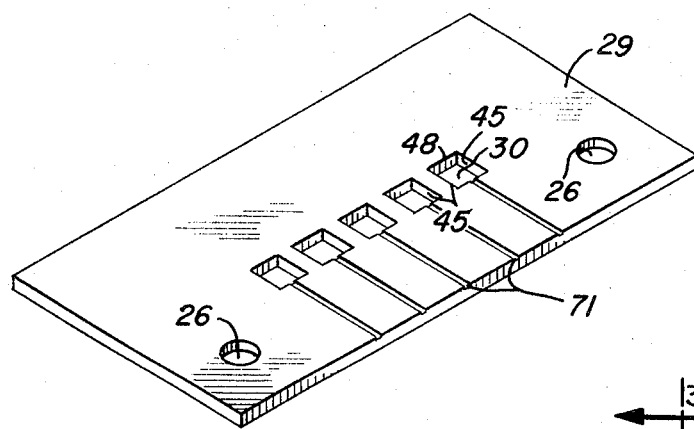
FIG. 1A shows another embodiment of a cavity plate usable in the apparatus of FIG. 1.
Figure 2:
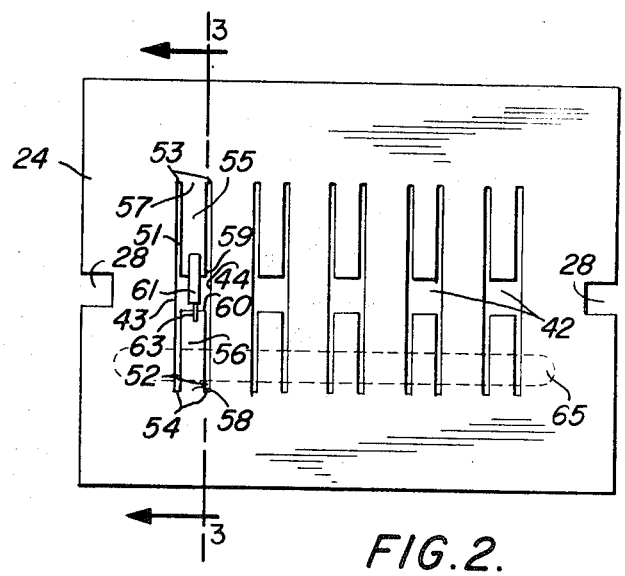
FIG. 2 is a plan view of the frame member used in the molding apparatus of FIG. 1.

The cavity plate assembly 23 can consist of a two piece unit as shown in FIG. 1 or as the single piece unit 29 of FIG. 1A. The essential feature of the cavity plate is that it contains one or more cavities 30 either integrally as in FIG. 1A or when assembled as in FIG. 1. These cavities 30 have the same length and width as the intended dimensions of the molded part. The depth of the cavity plates 23 or 29 does not represent the entire depth of the intended molded part, however, since the depth or thickness of the frame member 24 contributes to the depth of the mold cavities, as will be explained hereinafter.

The cavity plate assembly 23 of FIG. 1 consists of a main section 31 which has a series of open-ended notches 32 formed along the edge 33 of the midportion of one side of the main section 31. This midportion may be formed to extend out further from the side of the main section, for a purpose to be explained shortly, by having the neighboring end-portions 34 recessed. The end faces 35 of the strips or tines 35 separating the notch openings all lie in the same plane as the edge 33 whereby the placement of a flat strip of metal against the edge 33 and end faces 35 will close off the open ends of the notches 32 and form the desired series of mold cavities 30.

The closing of the notch openings 32 can be accomplished by wedging the tapered section 36 against the main section 31 so that a flat edge 37 of the tapered section abuts against the edge 33 of the main section 31. A means for accomplishing this includes a groove 38 formed in the upper surface 39 of the base plate 21. The depth of the groove is made equal to or less than the thickness of the main section 31 and tapered section 36, which are of the same thickness. The near wall of the groove is parallel to the long edge of the base plate and the far edge 40 of the groove is slanted at the same angle as the slant edge 41 of the tapered section. The configuration of the groove 38 is such as to snugly receive the assembled main and tapered sections 31 and 36 of the cavity plate assembly. To assemble the parts, the main section 31 is fitted over the alignment pins 25 and allowed to rest on the floor of the groove 38. The tapered section 36 is forced sufficiently into the opposite side of the groove to wedge itself between the slant face 40 of the groove and edge 33 of the main section. Since only the edge midportion 33 of the main section must contact the face 37 of the tapered section, there is less need for the use of excessive force to wedge the tapered section in place than if the whole length of the side portion had to be contacted by the tapered section. As a result there is less danger of warpage or distortion of the tines 36 forming the notch openings.

When the tapered section 36 is in place against the edge 33 of the main section the cavity plate is assembled and the mold cavities 30 are provided just as if it were made of one piece of metal, as in the embodiment of FIG. 1A. The advantage of using a two piece cavity plate as shown in FIG. 1 is that the forming of notches 32 is a much simpler metal working operation than forming the rectangular openings in the one piece cavity plate of FIG. 1A.

Figure 3:
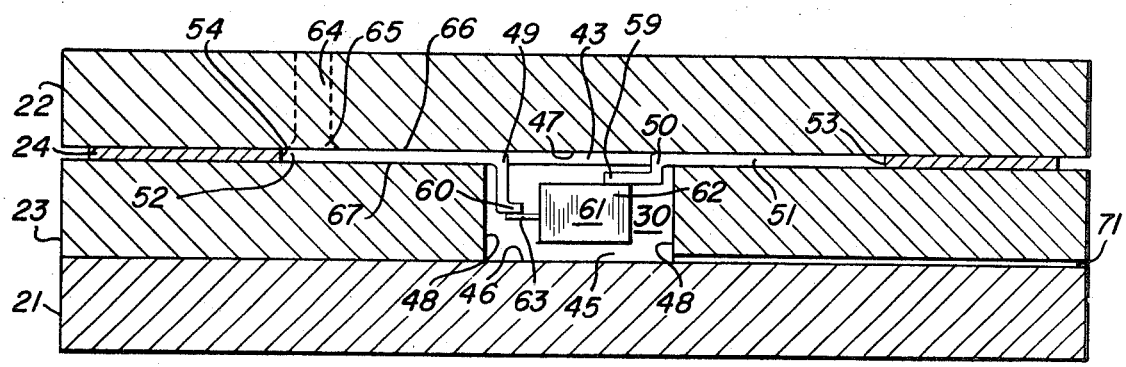
FIG. 3 is a sectional view of the frame member, taken along line 3—3 of FIG 2, and showing the frame member as it would appear in a molding apparatus, i.e., in an overturned position to that of FIG. 2.

With the cavity plate or cavity plate assembly positioned over the lower base plate 21, the frame member 24 is then positioned over the cavity plate with the alignment pins extending through the holes or notches 28. Referring to FIGS. 1, 1A, 2 and 3 the frame member 24 is seen to have a series of openings 42 shaped and spaced in correspondence with the shape and spacing of the mold cavity openings 30 in the cavity plate assembly 23 of FIG. 1. When the frame member is properly positioned over the cavity plate, the openings in each part will be registry, that is, the edges 43 and 44 of each frame member opening 42 will be an extension of the side walls 45 of the cavities 30 in the cavity plate. When the so-arranged frame member and cavity plate are mated between the closed lower base plate 21 and upper runner plate 22, the mold cavities will be completely formed. As seen in FIG. 3, the floor of the groove 28 in the base plate underlying the cavity plate 23 forms the floors 46 of the mold cavities, and the lower surface of the upper runner plate 22 forms the roofs 47 of the cavities. The side wall of the cavity is formed by the side wall 45 of the opening in the cavity plate and the edge 43 of the overlying frame member.

The end walls of the mold cavities are formed by the end walls 48 of the openings in the cavity plate and by the overlying portions 49 and 50 of the frame member. The frame member portions 49 and 50, however, do not completely close the ends of the mold cavities since provision is made to supply the fluid molding material through passageways formed in these portions of the frame member.

In the frame member, at least two pair of slots 51 and 52 extend from the central openings 42 to points 53 and 54 on the frame member inside its edges to define at least two narrow, elongated prong-like strips 55 and 56 each joined to the metal frame at one end only, 57 and 58 respectively, and with their free ends 59 and 60 extending into the central opening 42. The free ends 59 and 60 of the metal strips are bent out of the plane of the frame member so as to extend into the cavity to support a component 61 therein in a non-contiguous relationship to the walls of the cavity. As seen in FIG. 3, the ends 59 and 60 are bent to levels corresponding to the configuration of the component to be centered in the mold cavity. As seen there, an unencapsulated solid electrolytic capacitor 61 having a body portion 62 and an anode lead wire 63 is connected to the appropriately shaped ends 59 and 60 of the strips 55 and 56 and so supported in the mold cavity.

The fluid molding material is supplied to the mold cavities through selected slots in the frame member, as follows: fluidized molding material is forced through a sprue 64 in the upper plate 22 into a shallow groove 65 in the underside of that plate. The groove 65 serves as a runner and is arranged to run transversely of the pairs of slots 52 found on one side of the cavity openings 42 in the frame member. The fluid molding material flows through the passageways formed by the slots 52 and bounded by a roof 66 which is the underside of the upper plate 22 and a floor 67 which is the upper surface of the cavity plate 23. The slots 52 are blocked at one end by the wall 54 and the fluid molding material thus flows through these slots 52 and around the strips 56 into each of the mold cavities 30 where it encapsulates the components 61 held therein. The excess fluid molding material is forced out through the slots 51 extending from the opposite side of the openings 42. The escape of excess fluid molding material is blocked at the wall 53 at the end of the slots 51. For ease of viewing the flow of fluid molding material, the outline of the runner 65 is shown in dotted lines, on the plan view of the frame member 24 in FIG. 2 although of course, the runner is formed in the upper plate 22 and not in the frame member. Again in FIG. 1, the flow of fluid molding material is shown in dotted lines for ease of understanding.

As the fluid molding material enters and fills the mold cavities, the gases originally present in the cavities are vented therefrom through shallow grooves formed in at least one of the surfaces of the mating mold parts and entending from each cavity to the exterior of the molding apparatus, such grooves being formed to have too small a cross section to permit entry therein of the fluid molding material itself. For example, grooves 71 are shown in the surface of the cavity plate 29 of FIG. 1A and form gas vents 71 when this plate is assembled in the mold parts as shown in FIG. 3.

In the embodiments shown in the drawing only a single row of mold cavities is shown for convenience. Multiple rows of cavities could be provided in cavity plates and frame members by repeating the arrangements shown and by forming additional runners in the upper plate 22 along with additional sprues to supply these runners with fluid molding material. The runners would be arranged to communicate only with selected slots extending to each mold cavity whereby each mold cavity would be supplied with molding material and whereby the other slots extending from said cavities would receive the excess molding material. An arrangement of gas venting grooves, at least one for each cavity, could also be provided.

Figure 4:
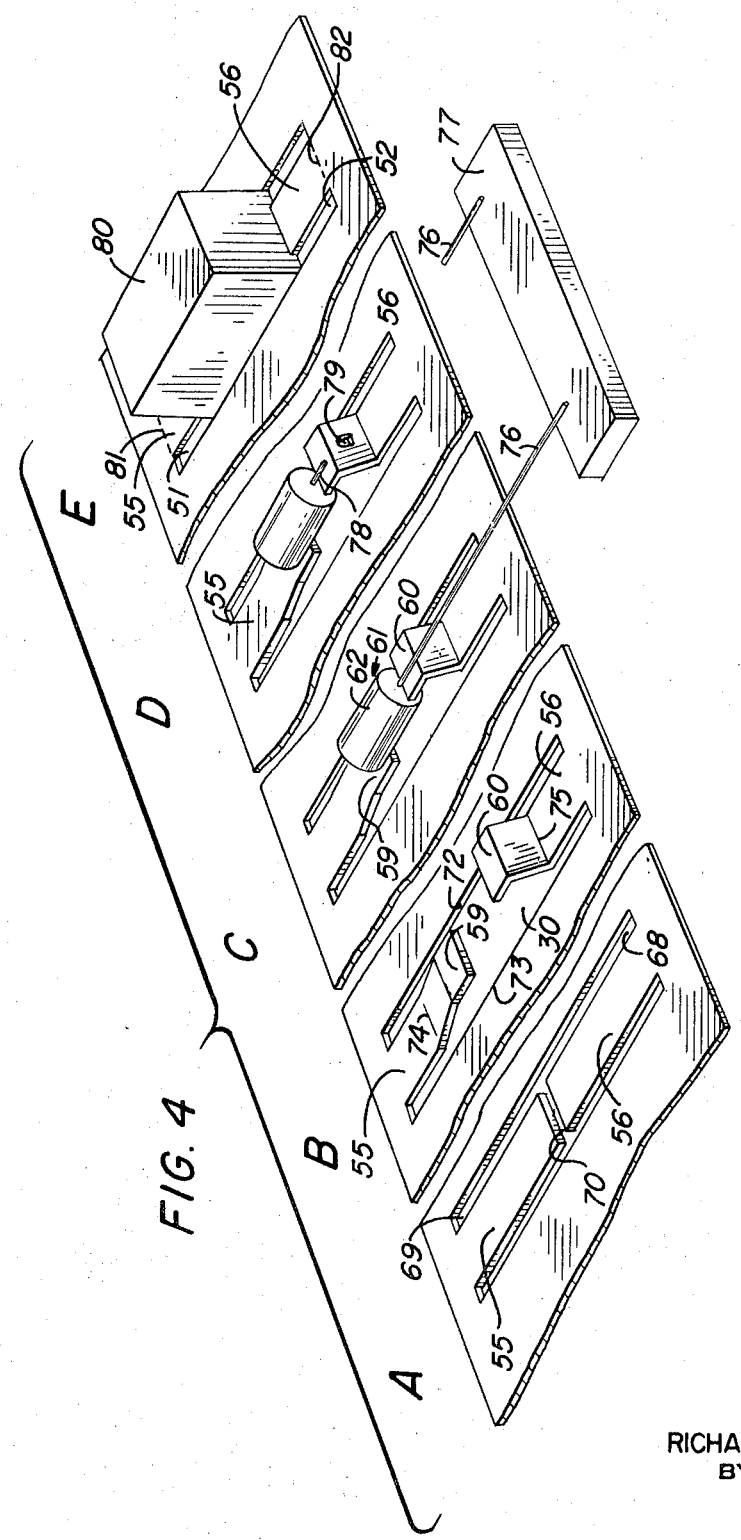
FIG. 4 A to E are a series of perspective illustrative fragmentary views, not to scale, showing a frame member and components in various stages of preparation for molding and then after molding.

Referring now to FIG. 4, fragments of a frame member 24 are shown pictorially at various stages of the manufacturing process. In FIG. 4A, the frame member has been provided with a pattern of cutouts designed to provide axial strip-line leads for a bipolar component. Parallel slots 68 and 69 have been formed in the frame member by removing, as by punching, two thin strips of metal. The metal strip left between the slots has been severed at 70 to provide two pairs of slots on each side of the cavity forming two prong-like metal strips 55 and 56 which will contact and support the component. In FIG. 4B the member is shown after the free ends 59 and 60 of the strips have been bent out of the plane of the frame member to form bonding pads, also designated 59 and 60, upon which the component will be placed. The intended dimensions of the molded part, as well as the shape and dimensions of the component to be molded, will determine the bend configuration of the free end portions of the strips 55 and 56. The width of the central opening 30, which will correspond in cross section to that of the mold cavity, is the same as the distance between the opposite edges 72 and 73 of the cutouts. The length of the central opening, which will correspond to the length of the molded part and hence the length of the mold cavity, is the distance between the points 74 and 75 where the free ends of the strips are first bent out of the plane of the frame member. The configuration of the central opening is thus determined by reference to the plane of the frame member.

In FIG. 4C, a solid electrolytic capacitor component 61 has been positioned on the bonding pads 59 and 60. This can be done in a convenient manner utilizing the process bars on which the capacitors have been processed. These capacitors are formed by pressing and sintering a porous tantalum body 62. A tantalum lead wire 76 is embedded in the porous body before pressing or welded thereon afterwards. The free ends of the lead wires of a row of such capacitors are then welded to an elongated process bar 77, the lead wires 76 being of equal length so that the capacitors are arranged in a parallel row. This assembly is passed through a production operation including dipping of the body 62 in various solutions to form the necessary functional elements of such capacitors. The handling of the bodies 62 during the various stages of production is done through use of the process bar 77. By arranging the process bar with its components spaced thereon in correspondence with the intended spacing of the central openings and bonding pads on the frame member, the components can be self jigged into place on the frame member. The process bar is laid along the frame member in a direction parallel to the row of bonding pads, and the bodies 62 allowed to rest on one set of bonding pads 59 while the lead wires 76 are all laid over the other set of bonding pads 60. The component is then secured to these bonding pads as by the soldering of the bodies 62 to the pads 59 and by welding of the lead wires 76 to the pads 60. The excess length of lead wire 76 is severed as at 78 in FIG. 4D to leave the stub 63 connected to the bonding pad 60. The process bar 77 is then removed. If desired, a series of cutouts 79 could have been formed in the free ends of the strips in order to provide anchorage sites for the molding material. As seen in FIG. 4D, the component is now permanently mounted on the free ends of the strips and is ready for insertion in the cavity plate openings. The frame member is placed over the cavity plate and the mold parts closed therearound. As shown in FIG. 3, the frame member is turned over so as to drop the component in the cavity 30 in the cavity plate. The arrangement of the frame member and cavity plate could be reversed as desired with the cavity plate laid over the frame member. It is only necessary that the frame member be arranged to support the component in the cavity in non-contiguous relation to the walls of the cavity and that a suitable system of runners be provided in the mold parts or cavity plate to supply molding material into the slots in the frame member.

In FIG. 4E, the now molded component 80 is shown. The strips 55 and 56 have their free ends embedded in the molded unit and are now the external leads of the molded components. The slots 51 and 52 would normally be occupied by hardened molding material at this stage of the operation, the slots 52 having been the passageways for feeding the molding material to the molded unit 80 and the slots 51 having been the overflow passageways for receiving excess molding material. The slots however are shown free of such material for convenience. After the molding material has hardened the frame member is removed from the mold and the strips 55 and 56 are severed from the frame member by cuts at 81 and 82, respectively. Any excess molding material in the slots or flash can be removed.

Figure 5:
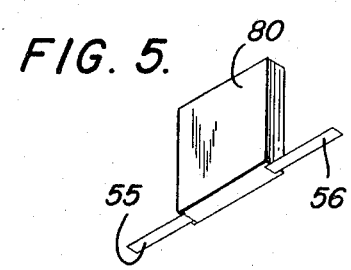
FIG. 5 is a perspective view of a molded component having coplanar axial leads.

FIG. 5 shows the molded component 80 after severence of the ends of the strips 55 and 56 from the frame member. These strips 55 and 56 are now the external leads for incorporation of the component into a circuit structure. The leads as formed are of a strip-line type in a coplanar axial arrangement and allow the use of the component in various types of hybrid circuit structures. The leads could also be shortened and bent 180° under the molded unit to form external planar bonding pads if desired, to make a component having high volumetric efficiency.

Figure 6:
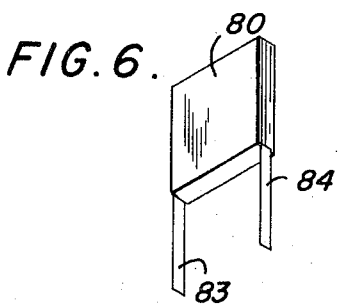
FIG. 6 is a perspective view of a component having radial leads.

FIG. 6 shows an alternative lead arrangement for the molded component 80 with the leads bent 90° downward to form radial leads 83 and 84 which are suited for use with through-the-board-mounted circuit boards. In such a case the leads 83 and 84 could be pointed to allow easier insertion into the holes of such a circuit board. The pointing of the leads could be done after removal of the molded unit from the frame member by a simple cutting operation. Or the frame member could have been provided with a pattern of cutouts which would yield pointed leads or any other desired shape or configuration of leads.

Figure 7:
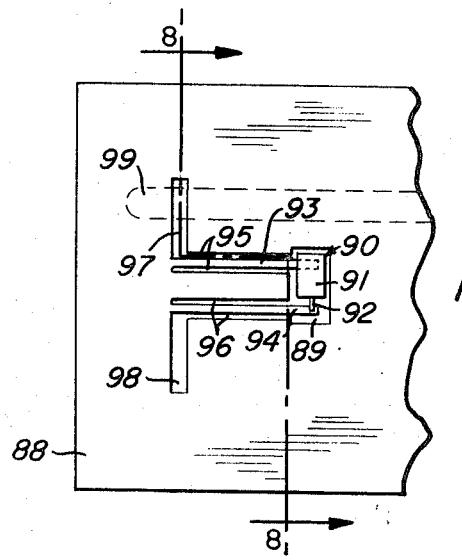
FIG. 7 is a plan view of a fragment of a frame member having a pattern of cutouts designed to provide coplanar radial leads extending from one side only of a component.
Figure 9:
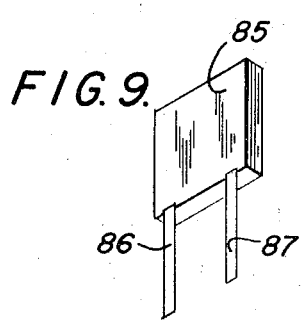
FIG. 9 is a perspective view of a molded component having coplanar radial leads.
Figure 8:
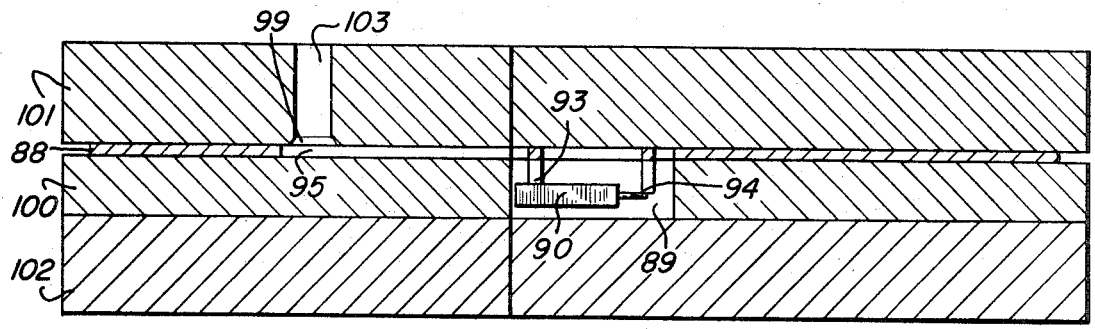
FIG. 8 is a sectional view, taken along line 8—8 of FIG. 7, showing the frame member of FIG. 7 as it would appear supporting a component in the molding apparatus.

As a further example of the technique for designing frame members to provide different types of lead configurations for components, reference is made to FIGS. 7, 8 and 9. As seen in FIG. 9, the desired configuration of external leads on the molded component 85 is a coplanar arrangement of radial leads 86 and 87. In FIG. 7, a fragment 88 of a frame member is shown with only one central opening 89 and one component 90 supported therein. A row of similar components could extend to the right on the complete frame member.

The component 90, which again is of a bipolar type having a body portion 91 and a lead wire 92, is supported at the free ends of two prong-like metal strips 93 and 94, respectively. The prong-like metal strips 93 and 94 are formed by a pattern of slots 95 and 96 in the frame member extending to the central opening 89. Additional cutout portions or slots 97 and 98 can be formed in the frame member to allow communication of one of the slots 95 with an overlying runner 99, shown in dotted lines as it would be arranged in the mold relative to the frame member. In FIG. 8, this frame member is shown in position over a cavity plate 100 and between the closed mold parts 101 and 102. A sprue hole 103 in the upper plate supplies fluid molding material to the runner 99 which feeds slot 95 leading to the mold cavity. Excess molding escapes through the slots 96 and extension 98, which could also be used to feed fluid molding material if the runners were to be arranged on that side of the mold. The molded component will appear as in FIG. 9 after severance of the leads 93 and 94 from the frame member.

Figure 10:
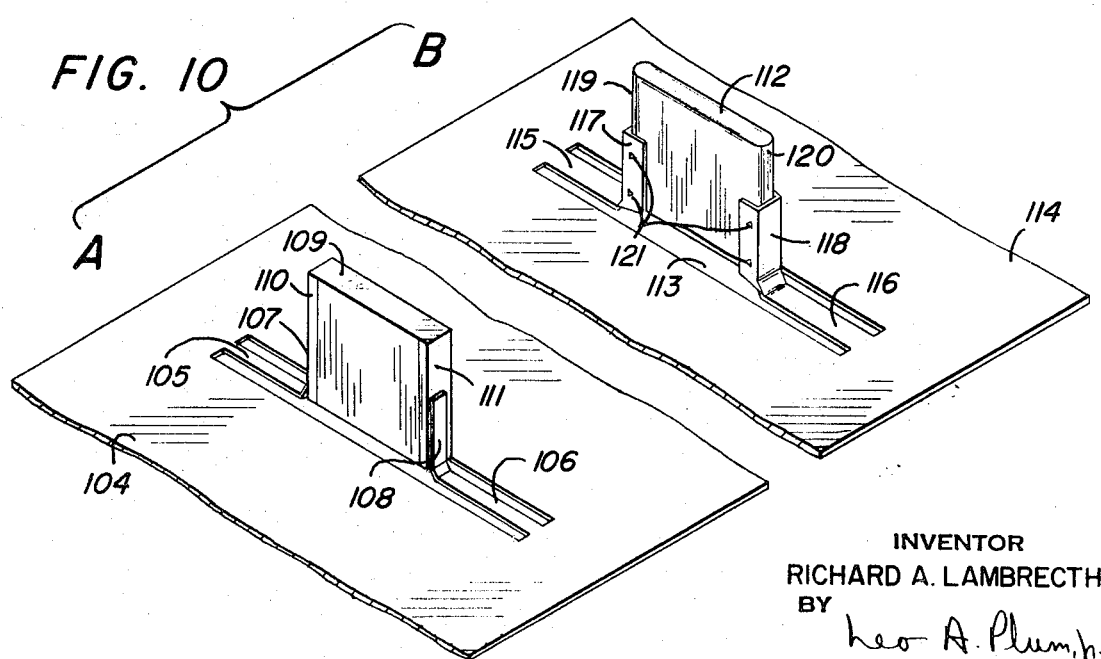
FIGS. 10 A and B are perspective illustrative fragmentary views, not necessarily to scale, showing variations of frame member cutout designs for contacting and supporting different types of components.

In FIGS. 10A and 10B, two additional arrangements are shown for contacting other types of bipolar electronic components to support said components in the mold cavities and for providing external leads. In FIG. 10A, a fragment 104 of a frame member is shown with prong-like strips 105 and 106 bent into vertically upstanding component contacts 107 and 108. A ceramic chip capacitor component 109 having metallized end pick-ups 110 and 111 is shown supported in the central opening 112 by having been soldered to the contacts 107 and 108 at the metallized ends 110 and 111 respectively. When encapsulated and severed from the frame member, the molded component will have external leads 105 and 106.

In FIG. 10B, a wound foil and plastic or paper dielectric capacitor 112 having alternate electrodes gathered at opposite ends and which has been flattened into a slablike shape is shown supported in the central opening 113 of a fragment of a frame member 114 by two metal strips 115 and 116. The ends of the metal strips 115 and 116 have been bent into clamp-like contacts 117 and 118 which grip the ends of the wound capacitor. Electrical contact to the inner electrodes of the wound unit can be provided by having the ends 119 and 120 of the capacitor ground to expose the metal foil windings gathered at each end of the winding or prong-like projections 121 can be punched through the sides of the clamps 117 and 118 to penetrate the plastic or paper windings and contact the foil windings. The molded unit will have external leads 115 and 116 when severed from the frame member. The width of the central opening in the frame member in this instance will be determined by the need to form the clamp-like portions 117 and 118 from the metal strips 115 and 116.

Components having more than two terminals to be contacted can also be molded using the system disclosed herein. The frame member is merely provided with a pattern of cutouts which provides one prong-like metal strip for each terminal on the component. These prong-like metal strips are formed by an appropriately designed pattern of slots in the frame extending from the central opening at positions dictated by the position of the terminals on the component when in the mold cavity and the desired external arrangement of the leads. If the cutout pattern so developed does not allow the convenient use of the slots to supply molding material to the mold cavities, then additional cutouts can be formed in the frame member to perform this function.

In view of the foregoing, it should be understood that a wise variety of electronic components can be molded using the molding apparatus of this invention. By using the principles disclosed herein, a person skilled in the art can readily provide a pattern of frame member cutouts and mold cavity configurations suitable for molding most types of electronic components having many possible desired lead configurations. In view of the use of the frame member cutout pattern as a means of supporting the component in the mold and for feeding the molding material to the mold cavities, there is a reduced need for complex machining of mold parts to provide for individual gates to each mold cavity and for grooves to hold the leads of the components. The designer need only provide for a system of sprues and runners in the mold parts to feed molding material into the appropriate frame member cutouts. The frame member itself can be made from sheet stock of, for example, only 4 to 6 mils thickness, but other thicknesses can also be used.

The venting grooves formed in one or more of the surfaces of the mating mold parts to allow the escape of air or other gases from the mold cavities as they are filled with molding material should be shallow so as to prevent the flow of molding material therethrough. Generally a groove with a depth of 1 or 2 mils will allow the venting of air therethrough but will be too small for the entry of molding material, depending on the feeding pressure and viscosity of the molding material. In the case of preblended epoxy molding materials which are supplied as ground solid materials and which are heated at the mold site to liquefy the compound which is then forced into the mold, a venting groove with a depth of about 2 mils will be small enough to prevent the entry of this material. When other less viscous molding materials are used, for example, the liquid epoxy molding materials, then the depth of the venting groove may have to be limited to about 1 mil. It is an important feature of this invention that such venting grooves can be provided. In conventional molding apparatus where the mold cavity is formed by the mating of two mold parts, each having one half the cavity formed therein, it is commonplace for air and other gases to be trapped in the depression at the roof of the cavity. Since the only escape route for such gases is through the seams or wire grooves at the centerline of the cavity, gases are easily forced into the roof or dome of the cavity as it is filled with molding material. In such cases an incompletely encapsulated molded unit is formed. A vacuum is sometimes drawn on the mold cavities in conventional molding practice to remove the gases therefrom to avoid the formation of such gas bubbles.

Using the arrangement of this invention however, it is possible to provide venting passageways to allow the escape of such gases from the roof of the mold cavities, or from the floor of the cavities as desired. The venting grooves are preferably formed in a surface of one of the mating mold parts opposite the entry point of the molding material, i.e., opposite the slots in the frame member through which molding material is discharged into the mold cavity. In this way the molding materials enters the cavity sweeping the gases ahead until they exit through the venting groove at an opposite end of the cavity. In FIGS. 1A and 3, the venting groove 71 is shown formed in the bottom surface of the frame member. The arrangement of the mold parts in FIG. 3 could also be reversed so that the frame member was situated under the cavity plate whereby molding material would enter the mold cavity at the bottom and the heated gases would rise and be swept out through the venting grooves 71. The venting grooves are not shown in the other figures of the drawings for simplicity. It should be understood that these venting grooves can be used where needed and that they can be formed in any of the different mold parts as desired, i.e., in the cavity plate, the frame member or upper or lower mold parts. It is only necessary that the grooves be shallow to admit gases but not molding material and that they extend from each mold cavity to the exterior of the molding apparatus.

A further advantage of the use of the molding system of this invention is that much lower clamping pressures can be used to close the mold parts. This is especially significant in view of the availability of newer liquid molding materials which are blended on site to give a low viscosity liquid molding material requiring transfer pressures as low as 25 p.s.i. By use of the molding system disclosed herein it is now possible to employ such materials in a press which will require a closing pressure of only, for example, two or three times the transfer pressure. In conventional molding apparatus, where massive mold parts each having half of the cavity formed therein are clamped together, a substantial force on the order of tons (depending on the area of the molds) is required to obtain effective closing of the mold. This is due to the size of the parts and also due to the problem of warpage of these heavy parts from repeated exposure to the elevated molding temperatures. In the molding apparatus of this invention however, the mold parts, and in particular, the frame member and cavity plate are light thin members. Any warpage of these parts can be overcome by a relatively light application of pressure. The amount of clamping pressure required to seal the mold thus becomes more a factor of the transfer pressure, i.e., the pressure at which the molding material is forced into the mold.

It is to be understood that only the preferred embodiments of the molding system have been illustrated. Variations in the configuration and arrangement of these parts can be made without loss of the advantages of this invention. For example, while the illustrated embodiments show mold cavities of a rectangular cross section, it is also possible to have mold cavities of other shapes. Additionally, a separate cavity plate need not always be used. In those cases where the expense of machining symmetrical die cavities in two mating mold parts is not prohibitive, then the cavity plate can be dispensed with and the advantages of the use of a frame member having slots for feeding molding material to the cavities still obtained. The extra machining normally required to form gates to each mold cavity and grooves for the lead wires extending therefrom is thus avoided by the use of the frame member as disclosed herein. Or a system of partially machined upper and/or lower plates along with cavity plates can be used to provide molding cavities of any desired configuration.

What is claimed is:

1. An improved system for molding components in insulative material, said system comprising at least two mold parts which have at least one molding cavity portion formed therein defining at least one molding cavity when said mold parts are brought together, a sheetlike metallic frame member adapted to fit snugly between the mating mold parts, said frame having a pattern of cutouts therein defining a central opening in registry with the mold cavity opening and at least two pairs of spaced-apart slots extending from said central opening to points on said frame short of its edges defining at least two narrow, elongated prong-like strips each joined to the metal frame at one end only with the free ends of said strips extending into the mold cavity and supporting an electronic component in said cavity, a passageway in one of said mold parts communicating with at least one of said cutouts leading to each mold cavity for introducing fluid molding material along said cutout and into the mold cavity to encapsulate said component, with at least one other of said cutouts extending from each mold cavity serving as an overflow passage to receive excess molding material from said cavity.

2. The molding system of claim 1 in which the pattern of cutouts in the frame member includes one pair of slots extending from the central opening for each terminal to be contacted on the component to be molded.

3. The molding system of claim 1 in which the cutouts employed to conduct fluid molding material to each molding cavity are selected ones of said slots extending to each molding cavity.

4. The molding system of claim 1 in which the mold parts comprise a base plate, a runner plate and a cavity plate between said base and runner plates, and wherein cavity openings are formed in the cavity plate, whereby the frame member is positioned between runner plate and the cavity plate with the components supported in the frame member positioned in the cavities in the cavity plate.

5. The molding system of claim 4 in which grooves are formed in a mating surface of at least one of the mold parts, with at least one groove extending from each mold cavity to the exterior of the mold, the depth of said grooves being sufficient to allow gases to escape therethrough from the molding cavities when they are being filled with fluid molding materials but too shallow to allow entry therein of the molding material itself.

6. The molding system of claim 4 in which grooves are formed in a surface of the cavity plate extending from the mold cavity therein to the edge of the plate, the depth of said groove being sufficient to allow gases to escape therethrough from the molding cavities when they are being filled with fluid molding material but too shallow to allow entry therein of the molding material itself.

7. A molding system comprising at least two mold parts which have a plurality of molding cavity portions formed therein defining a plurality of spaced-apart molding cavities when said mold parts are bought together, a sheetlike metallic frame member adapted to fit snugly between the mating mold parts, said frame having a pattern of cutouts therein defining a plurality of central openings spaced apart in correspondence with the spacing of the mold cavities and with the central openings in registry with the cavity openings, and at least two pairs of spaced-apart slots in said frame extending from each central opening to points on said frame short of its edges and defining at least two narrow, elongated prong-like strips each joined to the metal frame at one end only with the free ends of said strips extending into the mold cavity in registration with said respective frame opening, a plurality of electronic components each supported in a mold cavity on the free ends of the at least two prong-like strips extending into each mold cavity, a sprue-like passageway in said mold parts communicating with runner passageways in said mold parts communicating with at least one slot for each mold cavity for introducing fluid molding material through said slots and into the mold cavities to encapsulate said electronic components, with at least one other of said slots extending from each mold cavity serving as an overflow passageway to receive excess molding material overflowing from said mold cavities.

8. Molding apparatus comprising a base plate, an upper runner plate, a cavity plate intermediate the runner and base plates and having a plurality of spaced-apart openings therethrough, a sheetlike frame member disposed between the cavity plate and the runner plate, said frame member having a pattern of cutouts therein defining a plurality of central openings in registry with the openings in the cavity plate and at least two pairs of spaced-apart slots in said frame extending from each opening to points in said frame short of its edges defining at least two narrow, elongated prong-like strips each joined to the frame at one of their ends only with their free ends bent out of the plane of said frame member into the opening in the cavity plate, a plurality of electronic components each supported in an opening in the cavity plate on the bent ends of the at least two prong-like strips, whereby when said base plate, cavity plate, frame member and runner plate are brought together a plurality of mold cavities are defined with the base and runner plates forming the floors and roofs of the mold cavities and with the registered openings in the cavity plate and frame member forming the side walls of the mold cavities, said runner plate additionally having a sprue hole extending therethrough and communicating with at least one runner-like depression therein overlying and communications with at least one selected slot in the frame member extending to each mold cavity so that the fluid molding material can be introduced from said sprue hole into the runner depressions and through the underlying slots into the mold cavities to encapsulate the components therein, with other selected slots extending from each of said mold cavities serving as overflow passages to receive excess molding from the mold cavities.

9. The molding apparatus of claim 8 wherein the cavity plate is a two piece member comprising a main section having a row of open-ended notches spaced along one side thereof in correspondence with the desired spacing of the mold cavities and wherein the second section is a tapered member having a straight edge for abutting against the notched edge of the main section and wherein the base plate has a wedge shaped groove for receiving the main and tapered sections of the cavity plate assembly when wedged in said groove, whereby the notch openings in said main section have their ends closed off by the straight edge of the tapered section to form the mold cavities.

10. The mold apparatus of claim 8 wherein the cutout pattern in the frame member includes one pair of slots defining one prong-like metal strip for each terminal on the components in each mold cavity.

11. The mold apparatus of claim 8 wherein the free ends of the metal strips extending into the mold cavities to support the components therein are each bent to a level out of the plane of the frame member corresponding to the desired level of the terminals to be contacted on each component.

12. The mold apparatus of claim 8 in which the pattern of cutouts on the frame member defines prong-like metal strips pre-shaped to serve as the external leads of the components after molding and severance of the strips from the frame member.

13. The molding apparatus of claim 8 wherein the frame member is composed of a more malleable metal than the metal of the other mold parts.

14. The molding apparatus of claim 8 wherein the pattern of cutouts in the frame member provides the prong-like metal strips at positions around the central openings in conformity with the desired arrangement of the external leads on the molded components.

15. The molding apparatus of claim 8 wherein the frame member has a pattern of cutouts comprising a pair of slots extending from opposite sides of each central opening to form a prong-like strip on each side of central opening for supporting a two-terminal component and for providing axial leads for said component after molding.

16. The molding apparatus of claim 15 wherein the free ends of the strips extending into said mold cavity are bent into clamp like configurations and grip the ends of a slablike component.

17. The molding apparatus of claim 8 wherein grooves are formed in a surface of the cavity plate extending from each mold cavity therein to the edge of said plate, the depth of said grooves being sufficient to allow the escape of gases therethrough from the molding cavities when they are being filled with molding material but too shallow to allow entry therein of the molding material itself.

18. The molding apparatus of claim 17 wherein the grooves are formed in the surface of the cavity plate not adjacent to the frame member.

19. The molding apparatus of claim 17 wherein the depth of the grooves is from 1 to 2 mils.

* * * * *